(12) United States Patent
Ziebarth

(10) Patent No.: US 7,947,102 B2
(45) Date of Patent: May 24, 2011

(54) SOOT FILTER

(75) Inventor: Robin Ziebarth, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 373 days.

(21) Appl. No.: 11/954,283

(22) Filed: Dec. 12, 2007

(65) Prior Publication Data

US 2008/0148700 A1   Jun. 26, 2008

Related U.S. Application Data

(60) Provisional application No. 60/876,311, filed on Dec. 21, 2006.

(51) Int. Cl.
*B01D 39/14* (2006.01)
*B01D 50/00* (2006.01)
*B01D 39/00* (2006.01)
*B01D 39/06* (2006.01)

(52) U.S. Cl. .............. 55/523; 55/522; 55/524; 422/169; 422/170; 422/171; 422/172; 422/177; 422/178; 422/179; 422/180; 422/181; 422/182

(58) Field of Classification Search ............ 55/522–524; 422/169–182
See application file for complete search history.

(56) References Cited

U.S. PATENT DOCUMENTS

| | | |
|---|---|---|
| 3,565,830 A | 2/1971 | Keith et al. |
| 4,316,822 A | 2/1982 | Fujitani et al. |
| 4,329,162 A | 5/1982 | Pitcher, Jr. |
| 4,515,758 A | 5/1985 | Domesle et al. |
| 4,727,052 A | 2/1988 | Wan et al. |
| 4,740,360 A | 4/1988 | Geus et al. |
| 4,828,807 A | 5/1989 | Domesle et al. |
| 4,857,089 A | 8/1989 | Kitagawa et al. |
| 4,902,487 A | 2/1990 | Cooper et al. |
| 4,902,664 A | 2/1990 | Wan |
| 5,013,705 A | 5/1991 | Koberstein et al. |
| 5,043,311 A * | 8/1991 | Engler et al. .................. 502/439 |
| 5,063,192 A | 11/1991 | Murakami et al. |
| 5,089,237 A * | 2/1992 | Schuster et al. .............. 422/180 |
| 5,098,455 A | 3/1992 | Doty et al. |
| 5,130,109 A | 7/1992 | Wan |
| 5,173,349 A | 12/1992 | Yavuz et al. |
| 5,194,154 A | 3/1993 | Moyer et al. |
| 5,198,007 A | 3/1993 | Moyer et al. |
| 5,254,519 A | 10/1993 | Wan et al. |
| 5,340,516 A | 8/1994 | Yavuz et al. |
| 5,491,120 A | 2/1996 | Voss et al. |
| 5,993,762 A | 11/1999 | Rajaram et al. |
| 6,255,249 B1 | 7/2001 | Voss et al. |
| 6,294,141 B1 | 9/2001 | Twigg et al. |
| 6,306,335 B1 | 10/2001 | Wallin et al. |
| 6,508,852 B1 | 1/2003 | Hickman et al. |

(Continued)

FOREIGN PATENT DOCUMENTS

EP          1142619          4/2001

(Continued)

*Primary Examiner* — Walter D Griffin
*Assistant Examiner* — Amber Orlando

(57) ABSTRACT

An improved ceramic honeycomb filter has at least one porous partition wall defining a channel that is (1) microstructurally different along the length of the channel, (2) microstructurally different than at least a portion of a partition wall defining another channel or (3) combination thereof. The improved filter may be used for filtering Diesel exhaust and may have reduced back pressure and equivalent soot capture efficiency compared to a filter without having said microstructural differences.

28 Claims, 5 Drawing Sheets

U.S. PATENT DOCUMENTS

| | | |
|---|---|---|
| 6,582,796 B1 | 6/2003 | Joulin et al. |
| 6,596,056 B2 * | 7/2003 | Domesle et al. ............. 95/285 |
| 6,596,665 B2 | 7/2003 | Wallin et al. |
| 6,669,751 B1 | 12/2003 | Ohno et al. |
| 6,753,294 B1 | 6/2004 | Brisley et al. |
| 6,813,882 B2 * | 11/2004 | Hepburn et al. ............. 60/286 |
| 6,902,599 B2 | 6/2005 | Bardon |
| 7,041,359 B2 | 5/2006 | Hijikata |
| 7,451,849 B1 * | 11/2008 | Zuberi et al. .............. 180/218 |
| 7,572,416 B2 * | 8/2009 | Alward et al. ............. 422/180 |
| 7,601,194 B2 * | 10/2009 | Beall et al. ................ 55/523 |
| 2001/0038810 A1 | 11/2001 | Wallin et al. |
| 2002/0044897 A1 | 4/2002 | Kakwani et al. |
| 2002/0197191 A1 | 12/2002 | Takeshima et al. |
| 2003/0124037 A1 | 7/2003 | Voss et al. |
| 2004/0231307 A1 * | 11/2004 | Wood et al. ................ 55/523 |
| 2005/0042151 A1 * | 2/2005 | Alward et al. ............. 422/177 |
| 2005/0113249 A1 | 5/2005 | Ziebarth et al. |
| 2005/0239640 A1 * | 10/2005 | Nilsson et al. ............. 502/202 |
| 2006/0197265 A1 * | 9/2006 | Saha et al. ................. 264/646 |
| 2007/0044443 A1 * | 3/2007 | Nixdorf et al. ............. 55/523 |
| 2010/0021355 A1 * | 1/2010 | deRuyter .................. 422/177 |

FOREIGN PATENT DOCUMENTS

| | | |
|---|---|---|
| GB | 1014498 | 12/1965 |
| GB | 1119180 | 7/1968 |
| WO | WO97/00119 | 1/1997 |
| WO | WO99/12642 | 3/1999 |
| WO | WO00/62923 | 10/2000 |
| WO | WO01/02083 | 1/2001 |
| WO | WO03/011437 | 2/2003 |
| WO | WO03/051488 | 6/2003 |
| WO | WO03/082773 | 10/2003 |
| WO | WO2004011124 | 2/2004 |
| WO | WO2005/097706 | 10/2005 |

* cited by examiner

Bar = 1 mm

Bar = 1 mm

Bar = 1 mm

Bar = 1 mm

SOOT FILTER

CROSS-REFERENCE TO RELATED APPLICATION

This application claims the benefit of U.S. Provisional Application Ser. No. 60/876,311, filed Dec. 21, 2006, which is hereby incorporated by reference.

FIELD OF THE INVENTION

The present invention relates to an improved ceramic honeycomb particulate filter. In particular, the invention relates to honeycomb ceramic filters that have at least one filtration wall that varies microstructurally.

BACKGROUND OF THE INVENTION

Diesel engines, because of the way they operate, emit soot particles or very fine droplets of condensate or a conglomerate of the two (particulates) as well as typical harmful gasoline engine exhausts (i.e., HC and CO). These "particulates" (herein Diesel soot), are rich in condensed, polynuclear hydrocarbons, some of which may be carcinogenic.

As the awareness of the danger Diesel soot presents to health collides with the need for greater fuel efficiency that Diesel engines provide, regulations have been enacted curbing the amount of Diesel soot permitted to be emitted. To meet these challenges, soot filters have been used. The filters have had many configurations as exemplified by GB 1,014,498 and U.S. Pat. No. 4,828,807. The most common and useful filters have tended to be porous ceramic honeycombs that have plugged channels such that the exhaust gas must enter a channel and pass through the wall of the channel as exemplified by U.S. Pat. No. 4,329,162.

To more effectively catalyze the combustion of soot and mediate polluting combustion gases such as NOx, CO and unburnt hydrocarbons, catalysts have been used. Catalysts have been employed on filter elements in series where the gas passes through one filter with a catalyst thereon and then passes through another having a different catalyst such as described by GB 1,014,498 and U.S. Pat. No. 4,828,807. In addition, catalysts have been placed on a flow through substrate honeycomb (three way catalytic converter in one's car) separately in front of a filter such as in U.S. Pat. No. 4,902,487. In a variation of this approach, a catalyst has been placed partially in the channels of a honeycomb filter on the inlet channels walls effectively creating a flow though catalyst on the front portion of the inlet channels as shown by U.S. Pat. Nos. 6,294,141 and 6,753,294. Each of these suffers from reducing the total effective filter area and excessive thermal stresses due to exaggerated different combustion along the length of the filter.

Finally U.S. Pat. No. 4,857,089 describes the use of ceramic layer that may be catalyst carrier particulates (e.g., alumina) or particles of the same composition as the walls of the ceramic honeycomb filter (e.g., cordierite) on the outlet end of the honeycomb filter to mitigate damage from burning of the soot to regenerate (i.e., clean the filter so that the engine can continue to operate).

What is needed is a Diesel particulate filter that avoids one or more problems of the prior art such as one of the aforementioned problems. In particular, it would be desirable to provide a Diesel particulate filter that maximizes the effective filtration area while smoothing out temperature differences within the catalyst due to combustion of differing species along the length of the filter. It would also be desirable when doing so to minimize or even reduce the pressure drop experienced in the filter due to reduction of the pore channel area due to coating with catalysts or other ceramic particulates.

SUMMARY OF THE INVENTION

We have discovered an improved honeycomb soot filter that maximizes the effective filtration area while providing excellent filtration without much or any increase in back pressure and surprisingly in some instances may result in lower back pressure than prior honeycomb filters. The filter may be able to mitigate temperature differences due to differing species (e.g., hydrocarbons, soot etc.) being combusted preferentially along the filter, which surprisingly allows the filter to have improved soot combustion and thermal shock resistance than filters without filtration walls that are microstructurally different along the length of the channel or radially from one channel to another. In addition, the invention may allow more even distribution or redistribution of the soot to specific areas of the filter. For example, the soot may be redistributed by directing the gas flow to peripheral channels away from center channels resulting from the flow caused by the connection of the exhaust pipe to the filter can.

A first aspect of this invention is a ceramic honeycomb filter comprising a porous ceramic honeycomb body having an inlet end and outlet end connected by adjacent inlet and outlet channels that extend from the inlet end to the outlet end of the ceramic body, the inlet and outlet channels being defined by a plurality of interlaced thin gas filtering porous partition walls between the inlet and outlet channels and by ceramic plugs, such that the inlet channel has an inlet ceramic plug at the outlet end of the ceramic body and the outlet channel has an outlet ceramic plug at the inlet end of the ceramic body such that a fluid when entering the inlet end must pass through partition walls to exit the outlet end, wherein the ceramic honeycomb body has at least one porous partition wall that is (1) microstructurally different along the length of the channel, (2) microstructurally different than at least a portion of a partition wall defining another channel or (3) combination thereof.

Surprisingly, in one preferred embodiment described, the filter of the invention may preferentially capture finer soot particles at the inlet side of the filter due to changing flow along the walls of the channel realizing a more uniform soot deposition. This improvement may even result with a reduced back pressure, because of reduction of back pressure as a result of flowing down the channel. The preferential collection of finer soot particles within the inlet end tends to allow for reduced temperature differences during regeneration of the filter (i.e., burnout of the soot), because the entire length of the filter tends to contain a more uniform distribution of soot. In addition, it is believed that the soot in the partition wall closer to the outlet side of the filter tends to be solid particulate soot as opposed to liquid (soot containing hydrocarbon fractions).

Another aspect of the invention is a method of forming a porous monolithic ceramic honeycomb filter comprising, i) forming a monolithic ceramic honeycomb body comprised of ceramic grains and having an inlet end and outlet end connected by adjacent inlet and outlet channels that extend from the inlet end to the outlet end of the ceramic body, the inlet and outlet channels being defined by a plurality of interlaced thin gas filtering porous partition walls between the inlet and outlet channels and by ceramic plugs, wherein the monolithic honeycomb has not been heated sufficiently to substantially fuse the ceramic grains of the ceramic honeycomb body, ii) inserting, into a channel or portion of a channel of the ceramic honeycomb of step i), a microstructural altering compound, such that the microstructural altering compound is deposited on or within the partition walls defining the channel or channel portion, and iii) heating the ceramic honeycomb body of step ii) to a temperature such that the ceramic grains substantially fuse to form the porous monolithic honeycomb filter, said honeycomb filter having at least one partition wall that is (1) microstructurally different along the length of the channel, (2) microstructurally different than at least a portion of a partition wall defining another channel or (3) combination thereof.

The filter may be used in any applications in which particulates such as soot needs to be removed from a gaseous or liquid stream such as an automobile, train, truck or stationary power plant exhaust. The filter is particularly useful to remove soot from Diesel engine exhausts.

DETAILED DESCRIPTION OF THE INVENTION

Figure 1:
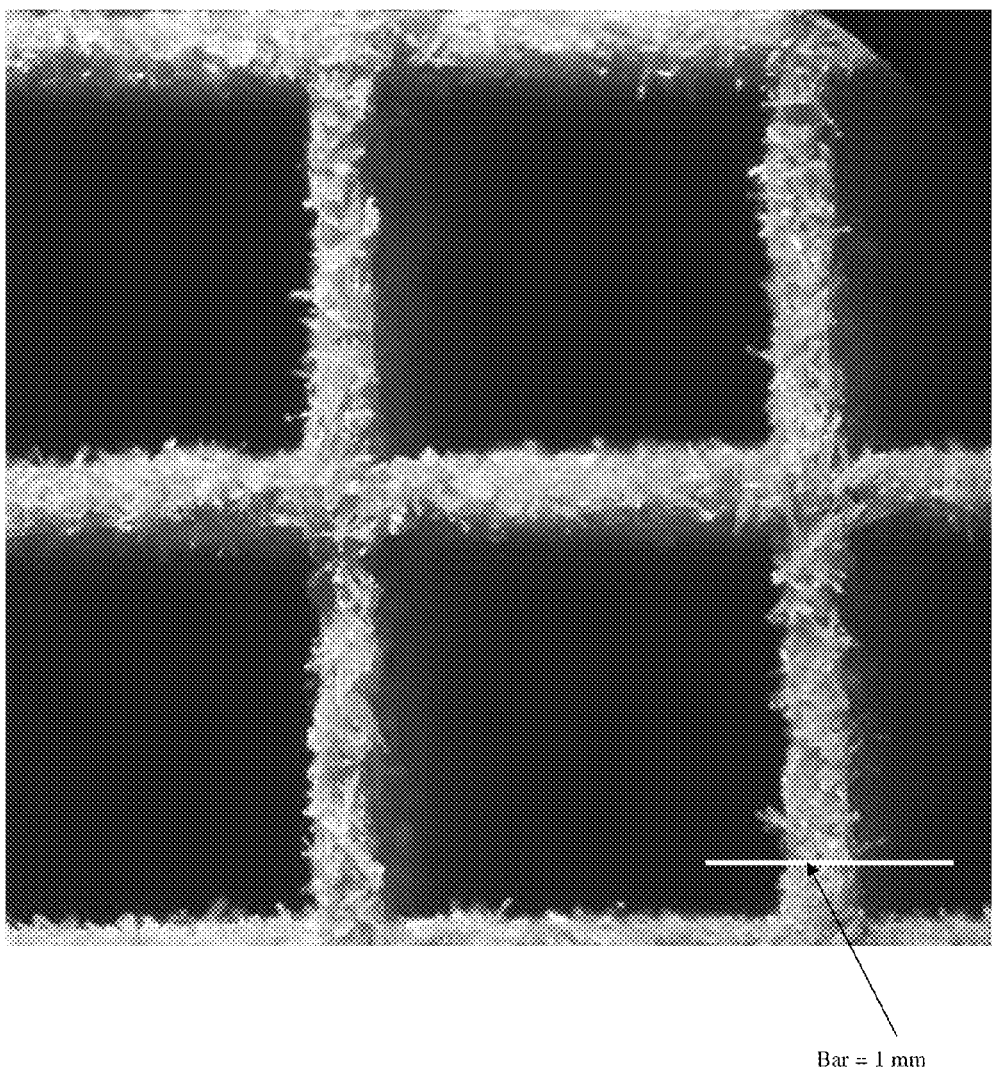
FIG. 1 is a view of a ceramic honeycomb filter of this invention looking down at the inlet end of said filter which has been subject to cerium, a microstructure altering compound (MAC). The bar represents 1 mm in the micrograph.

Microstructurally different means that the partition wall has in a portion of the wall at least one characteristic selected from the average pore size, pore size distribution, grain morphology (for example, average aspect ratio), grain size (for example, average equivalent spherical diameter) and total porosity that is at least 10 percent different than another portion along the length of the channel or portion in a wall defining another channel. Preferably the microstructure is at least 20 percent different, more preferably at least 30 percent, even more preferably at least 50 percent and most preferably at least 100 percent different. Each of the characteristics may be determined by a suitable technique, such as those known in the art (for example, electron microscopy and microscopy of polished sections). It is preferred that the microstructural difference is one selected from average pore size, grain morphology (e.g., grain aspect ratio), grain size or combination thereof. In a preferred embodiment the ceramic honeycomb filter has a uniform total porosity throughout the filter and one of the aforementioned characteristics being different.

The microstructural difference, generally, is also exemplified by the chemistry being different, but it need not be. For example, the process may be such that inner channels are subject to differing process conditions such that the microstructure that develops is different, such as size of the grains are smaller in the walls of the channels in the center of the honeycomb.

Portion herein means a region of substantial size to preclude localized anomalies that occur in typical processes when producing ceramic honeycombs. Generally, portion, herein, will be understood to be a volume that is about the channel width by 2 mm along the length of the channel by at least half the thickness of the partition wall, and preferably the thickness of the wall. It also understood that portions define specific volumes within the channel(s) of the honeycomb, with a first portion starting at a face and a subsequent portion is adjacent to the first portion moving towards the opposite in the same partition wall down a single channel and each further subsequent portion is adjacent to the preceding portion until the opposite face is reached. That is the honeycomb is defined by an imaginary array of adjacent portions of the size described.

It should also be noted that the portions that have differing microstructures do not have to be adjoining regions in the wall along the length of the channel, but, may be, for example, a portion at one end of a channel and the middle of the channel or at the opposite ends of the channel. Consequently, in a preferred embodiment, adjoining portions along the length of a channel do not differ in microstructure as defined herein, but at least two non-adjoining regions do differ along the length of the channel. This preferred embodiment typifies, for example, a smooth gradual change in microstructure along the length of the channel. The rate of change of such a gradient is exemplified by how many non adjoining regions must be traversed until a portion of differing microstructure to the first portion is encountered. Alternatively, there may be uniform zones of microstructure along the length of the channel. Typically when there are zones of uniform microstructure along the length of a channel, there are practically at most about 10 zones, preferably there are at most about 5 zones, even more preferably at most about 3 zones and most preferably 2 zones. The embodiments where there are 2 and 3 zones are further described in the next few paragraphs.

Figure 2:
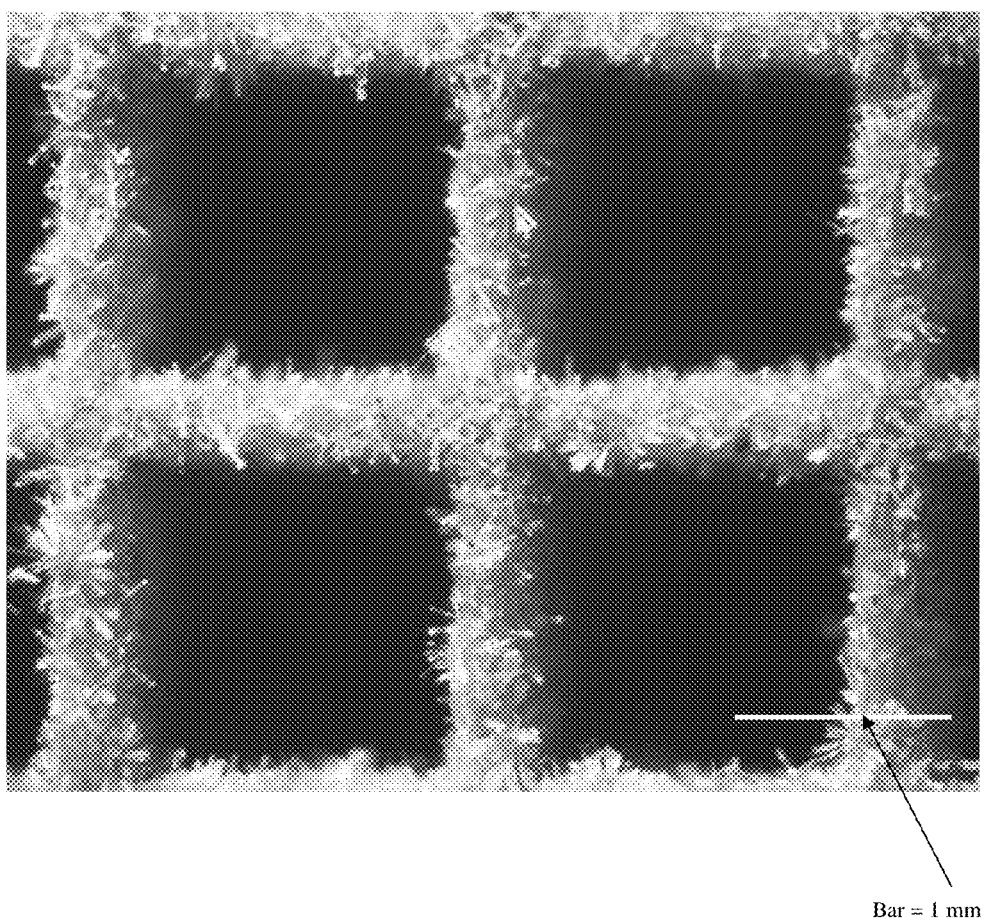
FIG. 2 is a view of the same filter of FIG. 1 looking down at the outlet side of the same filter as in FIG. 1, which has not been subjected to a MAC. The bar represents 1 mm in the micrograph.

An example of such a differing microstructure along the length of channel (2 zones) is a wall that has, at the inlet side, blockier grains (decreased aspect ratio) at the surface of the wall than the wall further along within the channel, which is shown in FIGS. 1 and 2 depicting the inlet and outlet ends of the monolith respectively. This filter displays less pressure drop and improved distribution of soot without any loss in soot capture efficiency compared to filters containing only one of the type of grains.

In a preferred embodiment, at least 10% of the channels of the walls have a microstructural difference along the length of the channel. Preferably, at least 20% of the channels have walls that have a microstructural difference along the length of the channel and in ascending preference the amount of channels with said microstructural difference along the length of the channels is at least 30%, 40%, 50%, 60, 70%, 80%, 90%, 95% and most preferably all of the channels have said microstructural difference.

In a preferred embodiment, the channels in the center of the honeycomb have the microstructural difference along the length of the body. As an illustration, the channels at the center of the honeycomb would create, for example, a circular bull's-eye in the center of the honeycomb when looking down the channels (same perspective as FIG. 1). It is understood that the bull's-eye may be of any useful geometric shape such as a square, rectangle, oval, parallelogram, hexagon and octagon. The channels making up the bull's-eye, preferably make up at least 10% of the channels to preferably at most about 80% of the channels. Preferably, said bull's-eye channels make up at least 20%, more preferably at least about 30%, and most preferably at least about 40% to preferably at most about 70%, more preferably at most about 60% and most preferably at most about 55% of the channels of the honeycomb. In an alternative preferred embodiment, the bull's-eye channels are channels that do not have the microstructural difference along the length of the channels, but the periphery channels surrounding the bull's-eye channels do, wherein the preferred proportion of bull's-eye channels just described are applicable to this alternative preferred embodiment.

Another preferred embodiment, is when the bull's-eye and periphery channels, as described above, do not individually differ in microstructure along the length of each channel, but the microstructures of the walls of the bull's-eye channels differ from the microstructure of the walls of the periphery channels. It is understood that the bull's eye channels may by surrounded by successive annular rings of channels having differing microstructure. Such annular rings may also alternate in structure where one or more of the rings of channels may have the same microstructure as the bull's eye channels, but of course not all of such rings of channels have the same microstructure as the bull's eye channels.

When a channel's or channels' microstructure differs along the length, preferably, the channel or channels have a uniform microstructure that is up to about 50% of the length of the channel beginning at the inlet end traveling toward the outlet end of the honeycomb, before the microstructure changes and differs for the remaining length of the honeycomb (outlet zone of uniform microstructure, "i.e., does not differ as described herein). The length of said inlet zone in rising preference is at most about 45%, 40%, 35%, 30%, 25%, 20%, 15%, and 10% to generally at least about 2% of the length 90 of the honeycomb. In a preferred embodiment, all of the channels have such inlet zones and outlet zones. In another preferred embodiment the bull's-eye or periphery channels described above have such inlet and outlet zones.

In another preferred embodiment, a channel or channels have three zones of differing uniform microstructure. The inlet zone being as defined in the previous paragraph, the outlet zone beginning at the outlet of the honeycomb and traversing towards the inlet of the honeycomb and a middle zone sandwiched between the inlet and outlet zone. In this embodiment each zone is at least about 2% of the length of the honeycomb. The inlet zone being, in rising preference at most about 50%, 40%, 30%, 20%, and 10%; the middle zone in rising preference being at most about 45%, 40%, 30%, 20%, and 10% and the outlet zone in rising preference being at most about 30%, 25%, 20%, 15%, 10% and 5% of the length of the honeycomb.

The honeycombs of the invention are preferably, one monolithic body, formed as described herein. Monolithic means that the honeycomb is not assembled from separate smaller honeycombs.

To create the honeycomb having differing microstructures of the invention, the honeycomb may be formed by extruding a ceramic paste (paste comprised of ceramic particulates and organic additives) into a honeycomb. The honeycomb may also be formed using a flat flexible sheet of ceramic, for example made by tape casting, that is then shaped to form a honeycomb. A channel or channels of the monolithic honeycomb are exposed to a microstructure altering compound (MAC). Such compounds, may alter the grain growth, fuse to the developing microstructure to decrease the porosity without causing any dimensional changes such that the honeycomb fractures upon heating to fuse the ceramic grains of the honeycomb. In another embodiment of the method, the MAC compound (e.g., glass frit) may be added to a honeycomb that has grains fused together such that it coats the porosity within the walls of the honeycomb and upon heating fuses to the grains of the walls of the honeycomb and decreases the porosity without the aforementioned dimensional change of the partition walls where it has been placed.

Generally, to avoid fracture, the difference in the change in dimension from a partition wall with the MAC to a wall without the MAC, is at most about 10% different, preferably in ascending preference 9%, 8%, 7%, 6%, 5%, 4%, 3%, 2%, 1%, 0.5%, 0.1% to essentially no difference, where essentially no difference is when, using typical measuring devices such as a caliper, the difference in dimensional change is statistically the same at a 90% confidence interval.

It is preferred, however, that the microstructure altering compound (MAC) is one that alters the grain growth behavior of a honeycomb upon heating to fuse the grains of the honeycomb. To accomplish this, the MAC is added to selected channels or along the length of select channels by any suitable method such as dipping or pouring and depositing the MAC on or within the partition walls of the selected channels or along the length of selected channels. Suitable techniques, for example, include those as described herein for depositing a catalyst upon a ceramic honeycomb with fused grains.

The MAC once deposited in or on the partition wall needs to remain or fail to cause the rest of the honeycomb to be affected such that the honeycomb becomes uniform in microstructure. For example, the MAC should not volatilize such that it forms a gas upon heating to fuse the ceramic grains, but rather should melt and be incorporated into the ceramic grains upon heating to fuse the ceramic grains. Thus, it is preferred that the MAC is a solid particulate in a liquid slurry or compound that is precipitated from a liquid solution on or into the walls of the honeycomb.

The deposition is preferably carried out upon a honeycomb that has had any organic additives useful to make the honeycomb removed (i.e., debindered honeycomb). The honeycomb may be heated to a temperature such that light sintering (fusing) of the ceramic particulates occurs. This light sintering, is generally where less than about 10% of the grains are fused to another grain in the honeycomb and is commonly referred to as bisque fired in the ceramic arts.

The MAC selected, generally, depends on the particular ceramic used to make the ceramic honeycomb such as compounds or particulates known to inhibit or accentuate grain growth. Illustratively, when forming acicular mullite, MACs include those described as nucleation control agents in U.S. Pat. No. 6,306,355, rare earth metals or compounds thereof and carbon. Preferably, for making acicular mullite, the MAC is a alkaline earth, rare earth metal or compound thereof (e.g., oxide). Preferably the alkaline earth is strontium or compound thereof. Preferably the rare earth metal is lanthanum, cerium, neodymium, gadolinium, europium, compound of any one of the aforementioned, or combination thereof. More preferably, the rare earth metal is lanthanum, cerium and neodymium, compound of any of the aforementioned or combination thereof. Most preferably, the rare earth metal is cerium, neodymium, compound of the aforementioned or combination thereof.

The honeycomb after being treated with the MAC is then heated and processed in similar way as a honeycomb without the MAC (e.g., sintered or heated as described for the acicular mullite described herein) to form the honeycomb filter of the invention such that the ceramic grains are substantially fused. Substantially fused is, generally, when at most about 1% by volume of the ceramic grains in the ceramic honeycomb are fused together (chemically bonded, for example, by a glassy or disordered grain boundary phase). Preferably, all of the ceramic grains are bonded/fused together. Suitable temperatures and conditions for fusing the ceramic grains and forming the porous ceramic honeycomb is dependent on the particular ceramic being utilized and are known in the art, such as described in the patents and applications for patents cited below regarding differing ceramics useful for making the honeycombs.

The porous ceramic honeycomb as well as the plugs (note, the plugs may be the same or a different ceramic than the honeycomb as well as may simply be the partition walls of the honeycomb pinched together to close off a channel) may be any suitable ceramic or combinations of ceramics such as those known in the art for filtering Diesel soot. Exemplary ceramics include alumina, zirconia, silicon carbide, silicon nitride, aluminum nitride, silicon oxynitride, silicon carbonitride, mullite, cordierite, beta spodumene, aluminum titanate, strontium aluminum silicates, lithium aluminum silicates. Preferred porous ceramic bodies include silicon carbide, cordierite and mullite or combination thereof. The silicon carbide is preferably one described in U.S. Pat. Nos. 6,582,796 and 6,669,751B1 and WO Publications EP1142619A1, WO 2002/070106A1. Other suitable porous bodies are described by WO 2004/011386A1, WO 2004/011124A1, US 2004/0020359A1 and WO 2003/051488A1.

The ceramic is preferably a ceramic having acicular grains. Examples of such acicular ceramic porous bodies include those described by WO 2005/097706 and acicular mullite as described, for example, by U.S. Pat. Nos. 5,194,154; 5,173,349; 5,198,007; 5,098,455; 5,340,516; 6,596,665 and 6,306,335; U.S. Patent Application Publication 2001/0038810; and International PCT Publication WO 03/082773.

The porous ceramic honeycomb, generally, has a porosity of about 30% to 85%. Preferably, the porous ceramic honeycomb has a porosity of at least about 40%, more preferably at least about 45%, even more preferably at least about 50%, and most preferably at least about 55% to preferably at most about 80%, more preferably at most about 75%, and most preferably at most about 70%.

The honeycomb as well as the channels may be any geometric cross-sectional configuration such as round, oval, square, rectangle or any other geometric shape depending on the application. The honeycomb may be any size and is dependent upon the application.

The partition walls may contain within the walls or coated upon the surface of the wall a catalyst. Such catalyst may be any useful to catalyze the combustion of soot, carbon monoxide and/or hydrocarbons. The catalyst preferably also abates one or more other pollutant gases in a Diesel exhaust stream such as NOx (e.g., selective catalyst reduction "SCR" to nitrogen and CO oxidized to form $CO_2$).

It typically is desirable for the catalyst to be comprised of an oxide washcoat and a metal catalyst on the washcoat. A preferred washcoat is an oxide of aluminum, cerium, zirconium, aluminosilicate (e.g., zeolite) or combination thereof. More preferably the washcoat is an oxide of cerium, zirconium or combination thereof. Other exemplary washcoats that may be useful are those that are described in U.S. Pat. Appl. 2005/0113249 and U.S. Pat. Nos. 4,316,822; 5,993,762; 5,491,120 and 6,255,249.

When using a washcoat, typical washcoats that are formed using ballmilling oxide particles may be used, but are not preferred because they tend to clog the pores of the partition walls of the honeycomb due to the average particle size typically being greater than 1 micrometer to about 20 micrometers. Examples of such washcoats are described by U.S. Pat. Nos. 3,565,830; 4,727,052 and 4,902,664. Preferably, the washcoat, when used, is precipitated from a solution as described by U.S. Pat. Appl. 2005/0113249, paragraphs 19-24, incorporated herein by reference.

The washcoat particulates, preferably, are colloidal particles dispersed within a liquid. Colloid herein means a particulate having an average particle size of less than 1 micrometer by number. The colloid may be crystalline or amorphous. Preferably, the colloid is amorphous. The colloid is preferably an alumina, ceria, zirconia or combination thereof. Such colloids are available under the trade name NYACOL, Nyacol Nano Technologies Inc., Ashland, Mass.

The colloid preferably has a small particle size where all of the particles are less than 750 nanometers (nm) in equivalent spherical diameter by number. Preferably the average particle size is less than about 500 nanometers (nm), more preferably less than about 250 nm, even more preferably less than about 100 nm, and most preferably less than about 50 nm to preferably at least about 1 nm, more preferably at least about 5 nm, and most preferably at least about 10 nm in diameter by number.

The amount of catalyst in the partition wall may be any useful amount and may vary in or on a wall along the length of a channel or channels or from channel to channel. Generally, the amount of catalyst may vary from about 10 to about 6000 grams per cu-ft and is dependent, for example, on the application and particular honeycomb used. The volume, as is convention, is taken as the geometric volume of the honeycomb, which in this case is taken as the cross-sectional area of the honeycomb by the length of the honeycomb.

Other examples of catalysts useful for combusting soot and hydrocarbons are described in col. 4, lines 25-59 of U.S. Pat. No. 4,828,807, incorporated herein by reference. Any of the catalysts described may be combined with a noble metal to improve the conversion of the gaseous pollutants traversing through the partition wall of the honeycomb filter.

The noble metal (e.g., platinum, rhodium, palladium, rhenium, ruthenium, gold, silver or alloys thereof), when used in the partition wall of the honeycomb, is preferably comprised of Pt, Pd, Rh, or combination thereof. Preferably, the noble metal is comprised of Pt and more preferably, the noble metal is Pt. The amount of noble metal may vary over a large range depending, for example, on the application. Generally, the amount of noble metal is about 1 g/cu-ft to about 500 g/cu-ft. Preferably the amount of noble metal is at least about 1, more preferably at least about 5 and most preferably at least about 10, to preferably at most about 250, more preferably at most about 125, and most preferably at most about 50 g/cu-ft.

Other exemplary catalysts include directly bound-metal catalysts, such as noble metals, alkaline metal, alkali metal base metals and combinations thereof. Examples of noble metal catalysts include platinum, rhodium, palladium, ruthenium, rhenium, gold, silver and alloys thereof. Examples of base, alkali, alkaline metal catalysts include copper, chromium, iron, cobalt, nickel, zinc, manganese, vanadium, titanium, scandium, sodium, lithium, calcium, potassium, cesium and combinations thereof. The metal catalyst, preferably, is in the form of a metal, but may be present as an inorganic compound or glass, such as a silicate, oxide, nitride and carbide, or as a defect structure within the ceramic grains of the porous partition walls of the honeycomb. The metal may be applied by any suitable technique, such as those known in the art. For example, the metal catalyst may be applied by chemical vapor deposition.

A second exemplary catalyst is one that is incorporated into the lattice structure of the ceramic grains of the porous ceramic. For example, an element may be Ce, Zr, La, Mg, Ca, a metal element described in the previous paragraph or combinations thereof. These elements may be incorporated in any suitable manner, such as those known in the art.

A third exemplary catalyst is a perovskite-type catalyst comprising a metal oxide composition, such as those described by Golden in U.S. Pat. No. 5,939,354. Other exemplary catalysts include those describe at col. 4, lines 20-59 in U.S. Pat. No. 4,828,807, incorporated herein by reference.

Other Exemplary methods for depositing one or more of the catalyst components are described in U.S. Pat. Nos. 4,515,758; 4,740,360; 5,013,705; 5,063,192; 5,130,109; 5,254,519; 5,993,762 and; U.S. Patent Application Publications 2002/0044897; 2002/0197191 and 2003/0124037; International Patent Publication WO97/00119; WO 99/12642; WO 00/62923; WO 01/02083 and WO 03/011437; and Great Britain Patent No. 1,119,180.

After contacting the porous ceramic, for example, with the colloid, the porous body is typically dried by any suitable method such as letting the liquid medium dry at ambient temperatures or lightly heating (e.g., up to 400° C. or so) in any suitable gas such as dry air, nitrogen or any other gas useful to dry the solution or slurry. After, drying, typically the catalyst is further heated, for example, to adhere and/or realize the catalyst chemistry desired (e.g., decompose a carbonate to an oxide) to form the catalyst within the walls. Generally, the heating temperature is at least about 400° C. to about 1600° C. Typically, the temperature is at least about 500° C. to about 1000° C. The heating may be any suitable atmosphere such as those known in the art for any given catalyst.

Differing zones of catalyst may be created by any suitable method, such as those known in the art such as dipping only one end of the honeycomb into a slurry or solution of the catalyst to be deposited. Combinations of dipping in a differing catalyst solutions or slurries at one or both ends, or immersion of the entire honeycomb in a catalyst solution or slurry followed by dipping another catalyst solution/slurry at one or both ends or any number of combinations thereof may be used to create the catalyzed filter. Removable coatings that act as barriers to the catalyst coatings may also be employed such as waxes.

EXAMPLES

Example 1

An approximately 40 mm×40 mm×130 mm piece of a bisque fired monolithic honeycomb prepared from 51 parts by weight of Todd Dark ball clay (Kentucky-Tennessee Clay Co., Mayfield, Ky.) and 49 parts by weight of kappa-alumina (Kappa Alumina ABA-6000-K, Selecto Scientific, Inc., Suwanee, Ga.) was placed end on into 10.5 mL of an aqueous solution containing 2.726 g of $Ce(NO_3)_3.6H_2O$. When the solution had been absorbed by the part such that a ~40 mm zone on the immersed end of the monolith was wet, the part was placed in a vacuum desiccator. The desiccator was evacuated and then backfilled to ~300 torr with $NH_3$ gas to precipitate the cerium ions (MAC) from solution. After 10 minutes, the $NH_3$ was removed from the desiccator, which was backfilled with air. The part was removed, dried in a 120° C. oven, and then heated in air to 600° C. and held at that temperature for 1 hour. The part was then converted to acicular mullite by the catalytic reaction with $SiF_4$ in the same manner as described in Example 4 of WO 03/082773A1 except that the reactor was filled to 500 torr with $SiF_4$ at 750° C. (instead 600 torr at 720° C.) and maintained at 500 torr through the remainder of the reaction.

The piece after being converted to mullite was crack free. The section of the honeycomb piece that was treated with the MAC (cerium) after being converted to mullite displayed blockier acicular mullite grains (lower aspect ratio) than the untreated section, as shown by FIGS. 1 and 2 respectively. Because of the blockier grains, the channels of the MAC treated section have a greater cross-sectional area than the channels of the end untreated with the MAC.

Example 2

An approximately 18 mm×18 mm×100 mm piece of a bisque fired monolithic honeycomb prepared in the same manner as Example 1 was placed end on into 3.0 mL of an aqueous solution containing 0.354 g $Sr(NO_3)_2$. Following absorption of the liquid such that approximately 60 mm of the monolith was wet, the part was dried in an oven at 120° C., and then heated in air to 600° C. and held at that temperature for 1 hour. The part was then reacted with $SiF_4$ as in Example 1.

Figure 3:
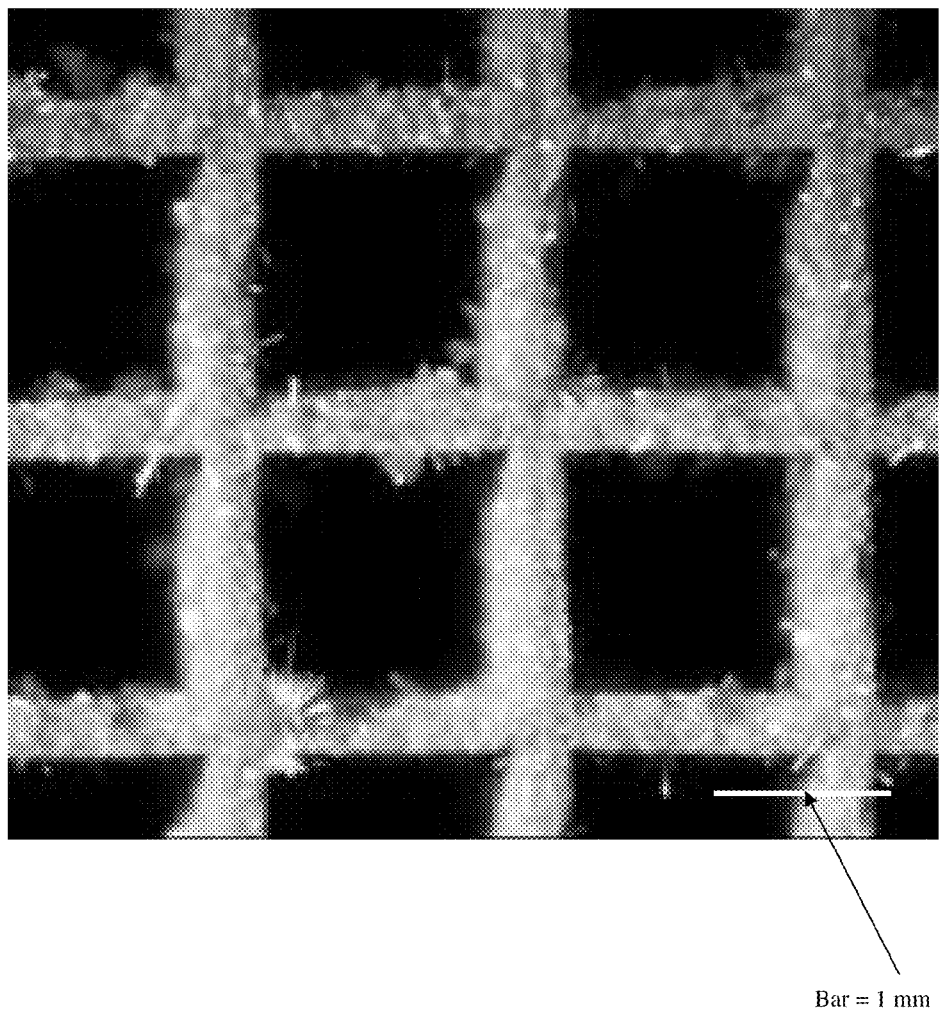
FIG. 3 is a view of a ceramic honeycomb filter of this invention looking down at the inlet end of said filter which has been subject to strontium, a microstructure altering compound (MAC). The bar represents 1 mm in the micrograph.
Figure 4:
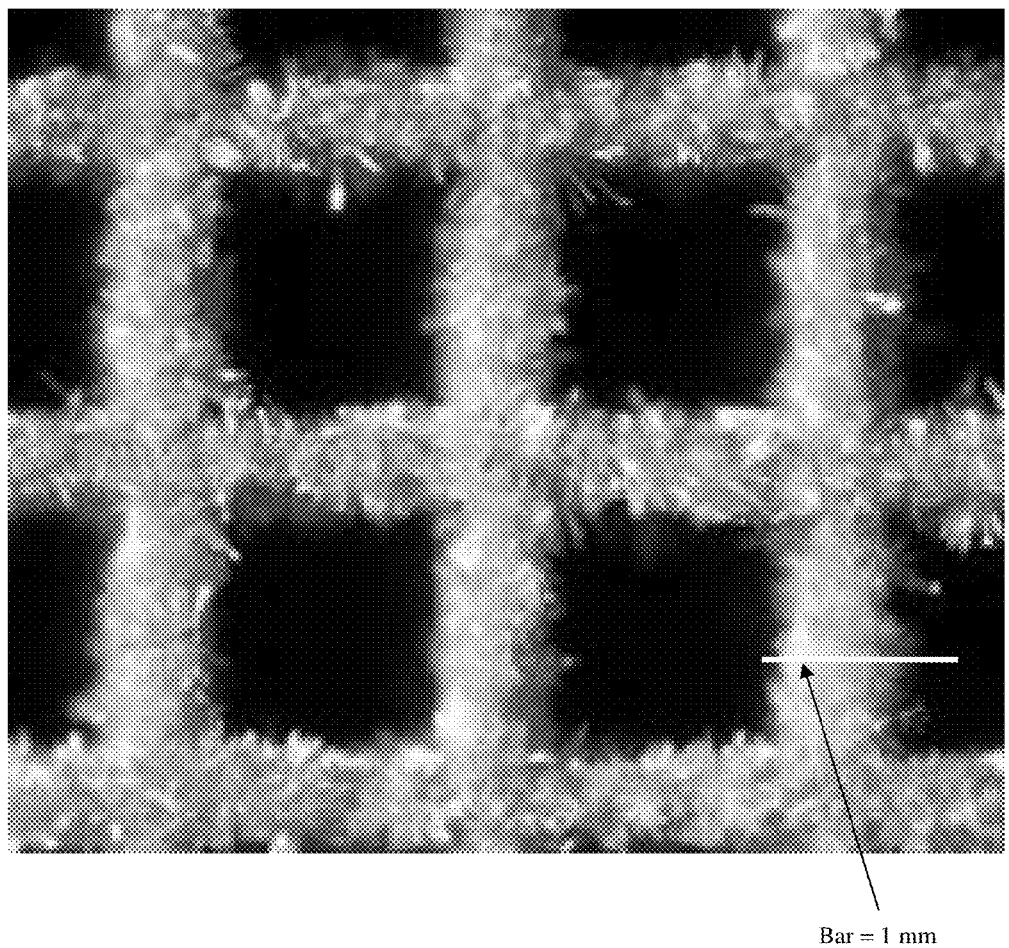
FIG. 4 is a view of the same filter of FIG. 3 looking down at the outlet side of the same filter as in FIG. 1, which has not been subjected to a MAC. The bar represents 1 mm in the micrograph.

The piece after reaction was crack free. The section of the honeycomb piece that was treated with the MAC (strontium) developed a platy morphology (lower aspect ratio) than the untreated section which developed an acicular morphology, as shown by FIGS. 3 and 4 respectively. Because of the platy grains, the channels of the MAC treated section have a greater cross-sectional area than the channels of the end untreated with the MAC.

Comparative Example

An identically sized piece of the same bisque fired monolith used in Example 1 was converted to acicular mullite in the same reactor run used in the Example except that this piece was not treated with a MAC.

Both, Example 1 and the Comparative Example piece's channels, were plugged in checker board fashion on each end to create a flow through filter.

Figure 5:
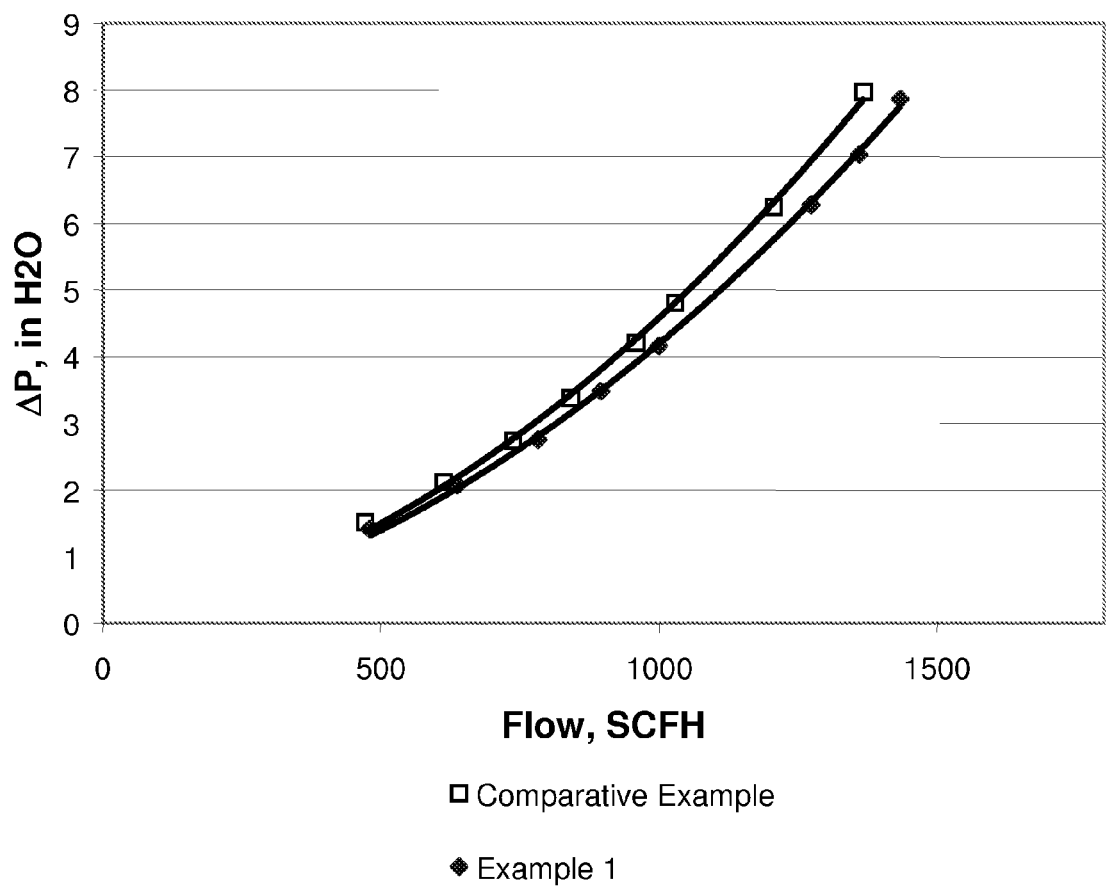
FIG. 5 is a comparison of the pressure drop through the wall flow filter depicted in FIGS. 1 and 2 and a similar filter not of this invention that has not been subjected to a MAC.

The pressure drop for a range of air flow rates at room temperature were measured for both honeycomb pieces of Example 1 and the Comparative Example. The MAC treated end of the Example's honeycomb was oriented so that gas flowed in this end and through the honeycomb to the other end. The results show (see FIG. 5) that the honeycomb of Example 1 (e.g., honeycomb that has a varying microstructure in the partition walls along the length of the channels) may have a desirably lower pressure drop in a filter application, such as a Diesel particulate filter, compared to a filter untreated with a MAC (uniform microstructure).

The following claims, even though they may not explicitly depend from one another, the invention contemplates any combination of one or more embodiments of any one claim combined with any one or more claims.

What is claimed is:

1. A ceramic honeycomb filter comprising a porous ceramic honeycomb body having an inlet end and outlet end connected by adjacent inlet and outlet channels that extend from the inlet end to the outlet end of the ceramic body, the inlet and outlet channels being defined by a plurality of interlaced thin gas filtering porous partition walls between the inlet and outlet channels and by ceramic plugs, such that the inlet channel has an inlet ceramic plug at the outlet end of the ceramic body and the outlet channel has an outlet ceramic plug at the inlet end of the ceramic body such that a fluid when entering the inlet end must pass through partition walls to exit the outlet end, wherein the ceramic honeycomb body has at least one porous partition wall that is (1) microstructurally different along the length of the channel, (2) microstructurally different than at least a portion of a partition wall defining another channel or (3) combination thereof, wherein microstructurally different is when the average pore size, pore size distribution, grain morphology, grain size, total porosity or combination thereof of the wall is at least 10% different.

2. The ceramic honeycomb filter of claim 1, wherein the honeycomb is comprised of an acicular ceramic.

3. The ceramic honeycomb filter of claim 2, wherein the acicular ceramic is acicular mullite.

4. The ceramic honeycomb filter of claim 1, wherein at least 10% of the partition walls are microstructurally different along the length of the channel.

5. The ceramic honeycomb filter of claim 4, wherein at least 50% of the partition walls are microstructurally different along the length of the channel.

6. The ceramic honeycomb filter of claim 5, wherein each and every partition wall is microstructurally different along the length of the channel.

7. The ceramic honeycomb filter of claim 1, wherein at least 10% of the partition walls are microstructurally different along the length of the channel and said channels are located in the center of the honeycomb when viewing the honeycomb looking down into the channels such that said channels form a bull's-eye.

8. The ceramic honeycomb filter of claim 7, wherein at least 20% of the partition walls are microstructurally different along the length of the channel.

9. The ceramic honeycomb filter of claim 8, wherein at least 50% of the partition walls are microstructurally different along the length of the channel.

10. The ceramic honeycomb filter of any claim 7, wherein the bull's-eye is roughly in the shape of circle, square, rectangle, cross, oval, parallelogram, trapezoid or hexagon.

11. The ceramic honeycomb filter of claim 1, wherein at least 10% of the partition walls located at the center of the honeycomb, when viewing the honeycomb looking down into the channels, said channels forming a bull's-eye and said channels being microstructurally different than at least a portion of a partition wall in channels peripheral of said channels defining said bull's-eye.

12. The ceramic honeycomb filter of claim 11, wherein at least 20% of the partition walls form the bull's-eye.

13. The ceramic honeycomb filter of claim 12, wherein at least 50% of the partition walls form the bull's-eye.

14. The ceramic honeycomb filter of claim 1, wherein at least 10% of the partition walls are microstructurally different along the length of the channel and said channels have at least two zones of uniform microstructure.

15. The ceramic honeycomb filter of claim 14, wherein the microstructural difference is average pore size, grain morphology, grain size or combination thereof.

16. The ceramic honeycomb filter of claim 15, wherein the microstructural difference is grain morphology, grain size or combination thereof.

17. The ceramic honeycomb filter of claim 1, wherein the honeycomb is monolithic.

18. A method of forming a porous monolithic ceramic honeycomb filter comprising,
   i) forming a monolithic ceramic honeycomb body comprised of ceramic grains and having an inlet end and outlet end connected by adjacent inlet and outlet channels that extend from the inlet end to the outlet end of the ceramic body, the inlet and outlet channels being defined by a plurality of interlaced thin gas filtering porous partition walls between the inlet and outlet channels and by ceramic plugs, wherein the monolithic honeycomb has not been heated sufficiently to substantially fuse the ceramic grains of the ceramic honeycomb body,
   ii) inserting, into a channel or portion of a channel of the ceramic honeycomb of step i), a microstructural altering compound, such that the microstructural altering compound is deposited on or within the partition walls defining the channel or channel portion, and
   iii) heating the ceramic honeycomb body of step ii) to a temperature such that the ceramic grains substantially fuse to form the porous monolithic honeycomb filter, said honeycomb filter having at least one partition wall that is (1) microstructurally different along the length of the channel, (2) microstructurally different than at least a portion of a partition wall defining another channel or (3) combination thereof wherein microstructurally different is when the average pore size, pore size distribution, grain morphology, grain size, total porosity or combination thereof of the wall is at least 10% different.

19. The method of claim 18, wherein the microstructural altering compound is a rare earth oxide.

20. The method of claim 18, wherein the microstructural altering compound, upon heating, alters the grain morphology such that the partition wall portion having said compound therein has at most a 10% different change in dimension than a partition wall portion without the microstructural altering compound.

21. The method of claim 20, wherein the change in dimension is at most about 5%.

22. The method of claim 21, wherein the change in dimension is at most about 2%.

23. The method of claim 22, wherein the change in dimension is at most about 0.1%.

24. The method of claim 23, wherein the change in dimension is statistically zero.

25. The method of claim 18, wherein the unfused ceramic grains are essentially equiaxed particles, that upon heating in step iii) form acicular grains that are fused together.

26. The method of claim 25, wherein the acicular grains that are formed are mullite grains.

27. The method of claim 18, wherein the microstructure altering compound is an alkaline earth or compound thereof.

28. The method of claim 27, wherein the microstructure altering compound is strontium or compound thereof.

* * * * *